United States Patent Office 3,187,049
Patented June 1, 1965

3,187,049
PROCESS FOR THE PREPARATION OF AMINO-METHYL-PHENOLS
Milton Green, Newton, and Warren E. Solodar, Waltham, Mass., assignors to Polaroid Corporation, Cambridge, Mass., a corporation of Delaware
No Drawing. Filed Oct. 17, 1961, Ser. No. 145,764
15 Claims. (Cl. 260—580)

This invention relates to chemistry and more particularly to novel chemical syntheses.

A principal object of the present invention is to provide a novel method for the preparation of certain silver halide developing agents.

Other objects of the invention will in part be obvious and will in part appear hereinafter.

The invention accordingly comprises the processes involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

It has been unexpectedly discovered that amino-methyl-phenols selected from the group consisting of 4-amino-2-methyl-phenol, 2-amino-4-methyl-phenol, and nuclear substituted 4 - amino - 2-methyl-phenols or 2-amino-4-methyl-phenols may be prepared simply and economically, in high yield, by a two-step process comprising the steps of: (1) reacting a nitro-phenol selected from the group consisting of 2-nitro-phenol and 4-nitro-phenol and nuclear substituted 2-nitro-phenols or 4-nitro-phenols having a free position meta to the nitro group, with a secondary amine and formaldehyde; and (2) effecting reduction of the resultant product in an acid medium.

In the first step of the reaction, a phenol is formed having an N,N-disubstituted aminomethyl substituent meta to the nitro substituent. The second step, that is, the reduction step, which is carried out in an acid medium, simultaneously effects debenzylation of the N,N-disubstituted aminomethyl substituent to form a methyl radical, as well as reducing the nitro substituent to form an amino group. This is quite surprising, since one skilled in the art would ordinarily expect only the nitro group to be reduced. When the reduction is not carried out in an acid medium only the nitro group is reduced, as would be expected, thereby forming an aminophenol containing the aforementioned tertiary amino substituent. Accordingly, it is critical to the practice of this invention that the reduction step be carried out in an acid environment.

As was indicated previously, the starting nitro-phenols may be nuclear substituted, provided that a free position remains meta to the nitro group. As examples of radicals which may be substituted on the phenol nucleus, mention may be made of lower alkyl or alkoxy radicals. The specifically preferred nuclear substituted phenols having a free position meta to the nitro group comprise 2-alkoxy-4-nitro-phenols, preferably wherein the alkoxy group contains from 1 to 5 carbon atoms, inclusive, such as 2-methoxy-4-nitro-phenol and 2-ethoxy-4-nitro-phenol.

It is also within the scope of the invention to have hindering or "substitution-directing groups" initially present on the nitro-phenol, which are removed by the reduction step. As examples of such substituents, mention may be made of the halogens, such as chlorine. In other words, if the starting nitro-phenol has two free positions meta to the nitro group and substitution is desired in only one of these free positions, a hindering substituent, such as chlorine, may be substituted in the other of the said free positions, thereby directing substitution of the tertiary amino group to the desired position. The chlorine substituent is readily removed during the reduction step.

The reduction which preferably comprises catalytic hydrogenation performed in the presence of a catalyst, such as palladium-on-charcoal or palladium-on-barium sulfate, must be carried out in the presence of an acid medium to effect reduction of the intermediate to form the desired amino-methyl-phenol.

In the preferred embodiment, the acid employed is a mineral acid such as hydrochloric acid, sulfuric acid, etc. However, other acids such as, for example, organic acids such as acetic acid, may also be utilized. Best results have been obtained when less than equimolar amounts of acid (based upon the amount of phenol) have been utilized and the amount of acid present in the reaction mixture is preferably from 0.5 to 0.85 molar equivalent. Lesser yields have been realized when quantities of acid smaller or greater than the preferred amounts have been employed. Accordingly, it is to be understood that while the aforementioned range of acid has been found to give the greatest yield, the invention is not limited to such ranges, since the desired product may be obtained when using greater or lesser amounts of acid.

As illustrative examples of secondary amines deemed suitable for utilization in the practice of the present invention, mention may be made of: secondary aliphatic amines such as dimethylamine, diethylamine, diisopropylamine, etc., and secondary cyclic amines, for example, secondary heterocyclic amines such as morpholine, piperidine, etc. It will be recognized from the reaction that the range of choice of the secondary amine to be employed is extensive. The preferred secondary amine comprises dimethylamine.

The present invention will be further illustrated in greater detail in conjunction with the following specific examples which set out representative applications of the novel processes of the present invention which, however, are not limited to the details therein set forth but are intended to be illustrative only.

EXAMPLE I

Synthesis of 4-amino-6-methoxy-2-methyl-phenol hydrochloride (A) Preparation of 2-methoxy-4-nitro-phenol.—A mixture of 100 grams of 2-amino-5-nitroanisole, 100 grams of sodium hydroxide, and 900 cc. of water was refluxed 30 hours, then allowed to cool overnight. The red crystals that separated were collected, dissolved in 3 liters of hot water, and this solution of the sodium nitromethoxy-phenoxide acidified with concentrated hydrochloric acid. The yellow precipitate of the phenol that came down was filtered off, dried, and crystallized from benzene to give yellow needles M.P. 98–99° C. Concentration of mother-liquors gave additional crops of usable material. [Yield= 96%] Ref.: Drake, Harris, and Jaeger, J.A.C.S. 70, 170 (1948).

(B) Preparation of 2-dimethylaminomethyl-6-methoxy-4-nitro-phenol.—To a gently refluxing solution of 14.5 grams of 2-methoxy-4-nitro-phenol, 45 cc. of ethanol, and 17.5 grams of 25% aqueous dimethylamine was slowly added 8 grams of 37% aqueous formaldehyde. The mixture was refluxed one hour on a steambath, then allowed to cool overnight. The yellow crystals that separated were filtered off and washed with ethanol, then with ether, and air-dried. The product melted at 195° C., with decomposition, and was used without purification in the following step. [Yield was 91%.]

(C) Preparation of 4-amino-6-methoxy-phenol hydrochloride.—A mixture of 13.3 grams of 2-dimethylamino-methyl-6-methoxy-4-nitro-phenol, 125 cc. of 95% ethanol, and 17.5 cc. of 3 N hydrochloric acid was heated on the steambath until the solid was completely dissolved. The solution was cooled, saturated with nitrogen, and 4 grams of 10% palladium-on-barium sulfate added. The mixture was then hydrogenated on a standard Parr apparatus under 30 p.s.i. of hydrogen. Uptake of hydrogen was complete in 25 minutes, the drop in pressure corresponding stoichiometrically to 100% nitro reduction plus 80% debenzylation. The reduction mixture was acidified immediately on opening with 10 cc. of concentrated hydrochloric acid, and catalyst was filtered off. The filtrate was concentrated in vacuum to about ⅕ its original volume, at which point white crystals began to separate. Concentrated hydrochloric acid (50 cc.) was added, and the mixture was then chilled and filtered. The precipitate was washed with acetone, then with ether. The product melted at 267° C. with decomposition. [Yield was 69%.]

*Analysis.*—Calculated for $C_8H_{12}ClNO_2$: C=50.7; H=6.4; Cl=18.7; N=7.4. Found: C=50.6; H=6.4; Cl=18.4; N=7.4.

EXAMPLE II

Synthesis of 4-amino-2-methyl-phenol hydrochloride (A) *Preparation of 2-dimethylaminomethyl-4-nitro-phenol.*—Reaction of p-nitro-phenol with formaldehyde and dimethylamine, according to the procedure set forth in Example I, gave a 59% yield of yellow solid product, M.P. 168–170° C.

*Analysis.*—Calculated for $C_9H_{12}N_2O_3$: C=55.1; H=6.2; N=14.3. Found: C=55.3; H=6.4; N=14.4.

(B) *Preparation of 4-amino-2-methyl-phenol hydrochloride.*—Reduction of 2-dimethylaminomethyl-4-nitro-phenol, according to the procedure set forth in Example I, gave an 89% yield of white crystalline product, M.P. 263–266° C.

*Analysis.*—Calculated for $C_7H_{10}ClNO$: C=52.7; H=6.3; Cl=22.2; N=8.8. Found: C=52.7; H=6.2; Cl=22.5; N=8.7.

EXAMPLE III

Synthesis of 2-amino-4-methyl-phenol hydrochloride 2-nitro-4-dimethylaminomethyl-6-chloro-phenol was prepared by reacting 2-nitro-6-chloro-phenol with formaldehyde and dimethylamine, as in the foregoing examples. A warm suspension of 7.7 g. of this product in 200 ml. of ethanol was hydrogenated over 4 g. of 10% palladium-on-barium sulfate according to the procedure described in Example I–(C). In this case, the acid required for debenzylation was generated in situ by the hydrogenolysis of the chlorine. 5 equivalents of hydrogen were taken up in 15 minutes. 2.4 g. of white crystalline product, M.P. 198–200° C., were recovered.

*Analysis.*—Calculated for $C_7H_{10}ClNO$: C=52.7; H=6.3; Cl=22.0; N=8.8. Found: C=52.4; H=6.3; Cl=22.0; N=9.0.

From the foregoing examples, it will be seen that the first step of the reaction, that is, the reaction between the nitro-phenol, formaldehyde and the secondary amine, forms a tertiary aminomethylnitro-phenol, which is then hydrogenated to yield the desired aminomethyl-phenol. It will be seen that the hydrogenation, when carried out in an acid environment effects debenzylation of the tertiary amino substituent to form a methyl radical as well as reducing the nitro substituent to an amino substituent. If the reaction is not carried out in an acid environment, debenzylation does not occur and only the nitro group is reduced. Example III illustrates the use of a hindering group (e.g., the 6-chloro substituent) to effect substitution of the tertiary amino group in the desired position. In the absence of such a hindering group, substitution would also take place in the 6-position. As will be noted, the chlorine substituent is removed during the hydrogenation. It will also be noted that the 6-chloro substituent further serves to supply the requisite acid environment, the acid required for debenzylation being generated in situ, thereby obviating the step of adding acid to the reaction mixture prior to hydrogenation.

Numerous of the amino-methyl-phenols prepared in the foregoing manner find extensive utilization as silver halide developing agents in conventional and diffusion transfer processes. Processes of the last-mentioned types are disclosed, for example, in the copending U.S. application of Milton Green, Serial No. 834,262, filed August 17, 1959, now Patent No. 3,108,001. The 6-alkoxy-4-amino-2-methyl-phenols, such as the 4-amino-6-methoxy-2-methyl-phenol prepared in Example I, are particularly useful developing agents.

This application is a continuation-in-part of copending U.S. application Serial No. 833,955, filed August 17, 1959 (now abandoned).

Since certain changes may be made in the above processes without departing from the scope of the invention herein involved, it is intended that all matter contained in the above description shall be interpreted as illustrative and not in a limiting sense.

What is claimed is:

1. The process which comprises reacting a compound selected from the group consisting of 4-nitro-phenol, 2-nitro-phenol, and alkoxy, alkyl and halogen derivatives thereof unsubstituted in a position meta to said nitro substituent, with a dialkylamine and formaldehyde to form the corresponding derivative having a N,N-dialkyl-aminomethyl substituent meta to said nitro group; and catalytically hydrogenating said derivative in an acid medium whereby to effect debenzylation of said N,N-dialkyl-aminomethyl substituent, removal of any halogen substituents nuclearly substituted on said phenol, and reduction of said nitro substituent, thereby forming the amino-methyl-phenol analogue of said derivative.

2. The process as defined in claim 1 wherein said dialkylamine is dimethylamine.

3. The process as defined in claim 1 wherein said acid medium comprises hydrochloric acid.

4. The process as defined in claim 3 wherein said acid is present in less than equimolar amounts.

5. The process as defined in claim 1 wherein said acid is present in an amount from 0.5 to 0.85 molar equivalents.

6. The process as defined in claim 1 wherein said hydrogenation catalyst is selected from the group consisting of palladium-on-charcoal and palladium-on-barium sulfate, and said acid is a mineral acid.

7. The process which comprises catalytically hydrogenating a compound selected from the group consisting of 2-N,N-dialkylaminomethyl-4-nitro-phenols, 4-N,N-dialkylaminomethyl-2-nitro-phenols and alkyl, alkoxy, and halogen derivatives thereof unsubstituted in a position meta to said nitro substituent, said hydrogenation being carried out in an acid medium whereby to effect debenzylation of said N,N-dialkylaminoethyl substituent, removal of any halogen substituents nuclearly substituted on said phenol and reduction of said nitro substituent, thereby forming the amino-methyl-phenol derivative of said initial phenol compound.

8. The process as defined in claim 7 wherein said dialkylamine is dimethylamine.

9. The process as defined in claim 7 wherein said acid medium comprises hydrochloric acid.

10. The process as defined in claim 9 wherein said acid is present in less than equimolar amounts.

11. The process as defined in claim 7 wherein said acid is present in an amount from 0.5 to 0.85 molar equivalents.

12. The process as defined in claim 7 wherein said hydrogenation catalyst is selected from the group consisting of palladium-on-charcoal and palladium-on-barium sulfate, and said acid is a mineral acid.

13. The process which comprises reacting p-nitro-phenol with formaldehyde and dimethylamine to form 2-N,N-dimethylaminomethyl-4-nitro-phenol; and catalytically hydrogenating said last-named phenol in an acid medium to form 4-amino-2-methyl-phenol.

14. The process which comprises the steps of reacting 4-nitro-phenol substituted in the 6-position with an alkoxy group having from 1 to 5 carbon atoms, with dimethylamine and formaldehyde to form the corresponding 6-alkoxy-2-dimethylaminomethyl-4-nitrophenol; and catalytically hydrogenating said last-named phenol in an acid medium to form the 6-alkoxy-4-amino-2-methyl derivative thereof.

15. The process which comprises the steps of reacting 4-nitro-6-methoxy-phenol with dimethylamine and formaldehyde to form 4-nitro-6-methoxy-2-dimethylaminomethyl-phenol; and catalytically hydrogenating said last-named phenol in an acid medium to form 4-amino-6-methoxy-2-methyl-phenol.

References Cited by the Examiner
UNITED STATES PATENTS 2,933,503   4/60   Clark et al. _____ 260—580
3,079,435   2/63   Freifelder et al. _____ 260—562

OTHER REFERENCES

Caldwell et al.: Journal of American Chemical Society, 1939, vol. 61, pp. 765–767.

Drake et al.: Journal of American Chemical Society, 1948, vol. 70, page 170.

CHARLES B. PARKER, *Primary Examiner.*
JOSEPH P. BRUST, *Examiner.*

UNITED STATES PATENT OFFICE
CERTIFICATE OF CORRECTION

Patent No. 3,187,049                             June 1, 1965

Milton Green et al.

It is hereby certified that error appears in the above numbered patent requiring correction and that the said Letters Patent should read as corrected below.

Column 2, line 70, for "6-methoxy-phenol", in italics, read -- 6-methoxy-2-methyl-phenol --, in italics.

Signed and sealed this 23rd day of November 1965.

(SEAL)
Attest:

ERNEST W. SWIDER                                EDWARD J. BRENNER
Attesting Officer                                       Commissioner of Patents